(12) United States Patent
Igarashi

(10) Patent No.: US 8,707,997 B2
(45) Date of Patent: Apr. 29, 2014

(54) FLUID DEVICE UNIT STRUCTURE

(75) Inventor: Hiroki Igarashi, Gyoda (JP)

(73) Assignee: Surpass Industry Co., Ltd., Gyoda-Shi (JP)

( * ) Notice: Subject to any disclaimer, the term of this patent is extended or adjusted under 35 U.S.C. 154(b) by 371 days.

(21) Appl. No.: 12/734,007

(22) PCT Filed: Oct. 3, 2008

(86) PCT No.: PCT/JP2008/068026
§ 371 (c)(1),
(2), (4) Date: Apr. 2, 2010

(87) PCT Pub. No.: WO2009/048020
PCT Pub. Date: Apr. 16, 2009

(65) Prior Publication Data
US 2010/0252134 A1 Oct. 7, 2010

(30) Foreign Application Priority Data
Oct. 11, 2007 (JP) .................................. 2007-265586

(51) Int. Cl.
*F16K 11/22* (2006.01)
(52) U.S. Cl.
USPC .......................................... 137/883; 137/563
(58) Field of Classification Search
USPC .......................................... 137/563, 883, 884
See application file for complete search history.

(56) References Cited

U.S. PATENT DOCUMENTS

| 4,627,465 A | * | 12/1986 | Kolibas et al. | ................ 137/563 |
| 7,077,163 B2 | * | 7/2006 | Schwarz | ........................ 137/883 |
| 2005/0284528 A1 | * | 12/2005 | Chao et al. | .................... 137/884 |
| 2007/0137707 A1 | | 6/2007 | Matsuzawa et al. | |

FOREIGN PATENT DOCUMENTS

| EP | 1990567 A1 | 11/2008 |
| JP | 2000-120903 A | 4/2000 |
| JP | 2000-240900 A | 9/2000 |
| JP | 2001-182849 A | 7/2001 |
| JP | 2005-207496 A | 8/2005 |
| JP | 2006-057645 A | 3/2006 |
| JP | 2007-002902 A | 1/2007 |
| JP | 2007-092959 A | 4/2007 |
| WO | WO-2007/100106 A1 | 9/2007 |

OTHER PUBLICATIONS

International Search Report dated Nov. 11, 2008, issued on PCT/JP2008/068026.

* cited by examiner

*Primary Examiner* — John Fox
(74) *Attorney, Agent, or Firm* — Edwards Wildman Palmer LLP; James E. Armstrong, IV; George N. Chaclas

(57) ABSTRACT

Provided is a fluid device unit structure in which a chemical solution stagnation portion that is formed between a valve of a main fluid flow path and a branching point of a return flow path is minimized to cause hardly any solidification of a chemical solution. In the fluid device unit structure in which a plurality of fluid devices that are connected via flow paths are integrated on a base member (10) to form a single unit, and the main fluid flow path (11) and the return flow path (12) formed in the base member (10) are respectively provided with a first valve (20) and a second valve (40) for switching the flow paths, the branching inlet (12a) at which the return flow path (12) branches from the main fluid flow path (11) is close to the upstream side of the first valve (20).

3 Claims, 4 Drawing Sheets

US 8,707,997 B2

FLUID DEVICE UNIT STRUCTURE

CROSS-REFERENCE TO RELATED APPLICATION

This application is the U.S. national phase, pursuant to 35 U.S.C. §371, of international application No. PCT/JP2008/068026 published in Japanese on Apr. 16, 2009 as international publication No. WO 2009/048020 A1, which claims the benefit of Japanese Patent Application Ser. No. 2007-265586, filed Oct. 11, 2007, the disclosure of which applications are incorporated herein in their entireties by this reference.

TECHNICAL FIELD

The present invention relates to a fluid device unit structure in which fluid devices, such as a valve and a pressure switch, are integrated.

BACKGROUND ART

In existing apparatuses for handling fluids such as chemicals (chemical solutions), various fluid devices (for example, valves, regulators, various sensors such as pressure sensors, and various switches such as pressure switches) serving as constituent elements are connected with piping to provide an integrated fluid device unit structure (integrated structure). In such fluid device unit structures, a main fluid flow path for supplying a slurry-like chemical solution and a return flow path branched from the main fluid flow path are included, and each flow path is provided with a valve that is used for switching the flow path.

Furthermore, in cases where a plurality of chemical-solution fluid devices are used, for example, as in a semiconductor manufacturing apparatus, an integrated structure that enables coupling the chemical-solution fluid devices to one another without using piping is proposed. Since piping is unnecessary, it is expected that a reduction in the overall size of the apparatus is possible (for example, see Patent Citation 1).
Patent Citation 1: Japanese Unexamined Patent Application, Publication No. 2000-120903 (see FIG. 1)

DISCLOSURE OF INVENTION

In a fluid device unit structure that can switch the flow path between a case in which supply of a chemical solution (slurry) is achieved by opening the valve of the main fluid flow path and closing the valve of the return flow path and a case in which return of the chemical solution is achieved by closing the valve of the main fluid flow path and opening the valve of the return flow path, it has been a problem that a chemical solution stagnation portion is formed when the chemical solution is returned. That is, since the path between the completely closed valve of the main fluid flow path and the branching point of the return flow path becomes a chemical solution stagnation portion that causes a liquid pool where the chemical solution hardly flows, a problem of solidification of the chemical solution remaining in the chemical solution stagnation portion has been noted.

For example, in a fluid device unit structure handling a slurry-like chemical solution that easily solidifies, such as an aqueous solution of dispersed silicon dioxide (abrasive liquid) used in a wafer chemical-mechanical polishing process (CMP process) of a semiconductor manufacturing process, if a chemical solution has solidified in the above-mentioned chemical solution stagnation portion, clogging of the main fluid flow path prevents the supply of chemical solution, or a reduction in cross-sectional area of the flow path causes a decrease in the amount of chemical solution supplied. These disadvantageously affect the semiconductor manufacturing process. Against such a background, it is desired to develop a fluid device unit structure that hardly causes solidification of a chemical solution by minimizing the chemical solution stagnation portion that is formed between the valve of the main fluid flow path and the branching point of the return flow path.

The present invention has been conceived under the above-described circumstances, and it is an object thereof to provide a fluid device unit structure that hardly causes solidification of a chemical solution by minimizing the chemical solution stagnation portion that is formed between the valve of the main fluid flow path and the branching point of the return flow path.

In the present invention, in order to solve the above-mentioned problems, the following solutions are employed.

In the fluid device unit structure of the present invention, a plurality of fluid devices that are connected via flow paths are integrated on a base member to form a single unit, and the main fluid flow path and the return flow path formed in the base member are respectively provided with a first valve and a second valve for switching the flow path, and the position at which the return flow path branches from the main fluid flow path is close to the upstream side of the first valve.

According to the present invention, since the position at which the return flow path branches from the main fluid flow path is close to the upstream side of the first valve, the volume (chemical solution stagnation portion) that is formed between the branching point of the return flow path and the upstream side of the first valve and that allows a liquid such as a chemical solution to remain therein can be minimized.

In the above-described invention, it is preferable that the vicinity of the upstream side of the first valve at which the return flow path branches from the main fluid flow path be a type in which the first valve moves a plug-type valve element up and down to open or close the upward-facing opening of the main fluid flow path and be a position of the base member that serves as a valve seat of the first valve and has a sufficient thickness ensuring the valve-seat stiffness. By doing so, in the state in which the first valve is completely closed by pressing the valve element against the valve seat, the chemical solution stagnation portion can be minimized while ensuring sufficient sealing performance of the first valve.

In the above-described invention, in the second valve, it is preferable that the second valve receives a liquid pressure with a diaphragm, opens and closes the return flow path by moving a plug-type valve element up and down by an open-and-close operation mechanism, and has a valve element having a base-side diameter smaller than a tip-side diameter. By doing so, a high back-pressure responsive second valve is provided. That is, by reducing the base-side diameter of the valve element and also the diaphragm diameter, the pressure (back pressure) of a liquid acting in the direction to open the valve element in the completely closed state can be reduced. Therefore, the force for pressing the valve element in the direction to close it can be decreased. Note that the open-and-close operation mechanism in such a case is, for example, operated by air pressure or an electromagnet.

According to the above-described fluid device unit structure of the present invention, the chemical solution stagnation portion that is formed between the valve of the main fluid flow path and the branching point of the return flow path can be minimized to provide a fluid device unit structure in which hardly any chemical solution solidifies. Therefore, even if the liquid to be handled is one that easily solidifies, such as a slurry-like chemical solution, prevention of the supply of chemical solution due to clogging of the main fluid flow path does not occur, or a decrease in the supply amount of chemical solution due to a reduction in cross-sectional area of the flow path does not occur. Therefore, the structure has a notable effect of enhancing the reliability of the semiconductor manufacturing process.

EXPLANATION OF REFERENCE

Figure 1:
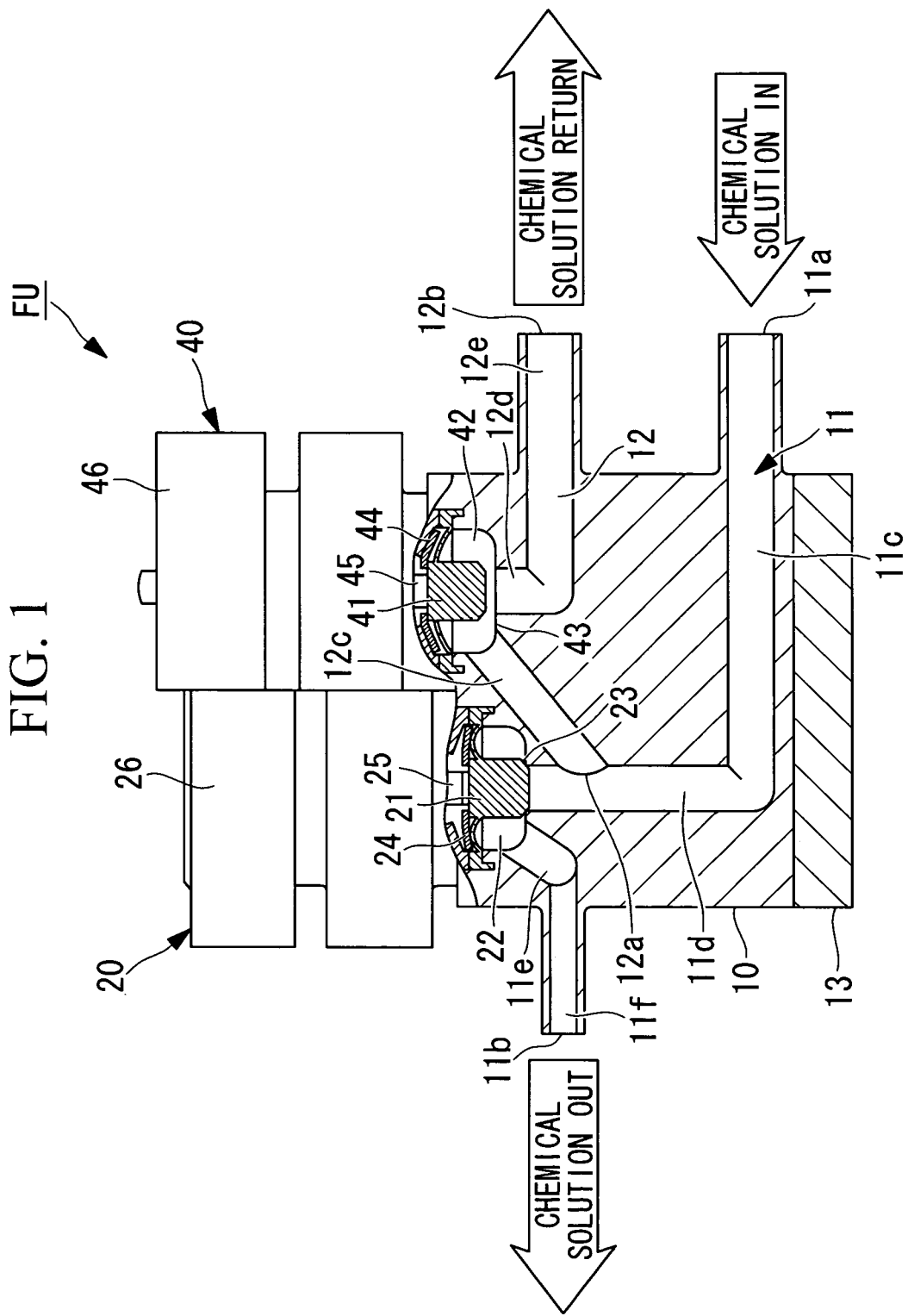
FIG. 1 is a cross-sectional view of a relevant portion showing a flow path formed in a base member, as an embodiment of a fluid device unit structure according to the present invention.

FU: fluid device unit
10: base member
11: main fluid flow path
11d: vertical flow path section
12: return flow path
12c: branching inlet
20: first valve (pneumatic valve)
21, 41, 51: valve element
22, 42, 52: valve chamber
23, 43, 53: valve seat
24, 44, 54: diaphragm
40: second valve (pneumatic valve)
50: pneumatic valve (high back-pressure responsive valve)

BEST MODE FOR CARRYING OUT THE INVENTION

An embodiment of a fluid device unit structure according to the present invention will be described below based on the drawings.

Figure 2:
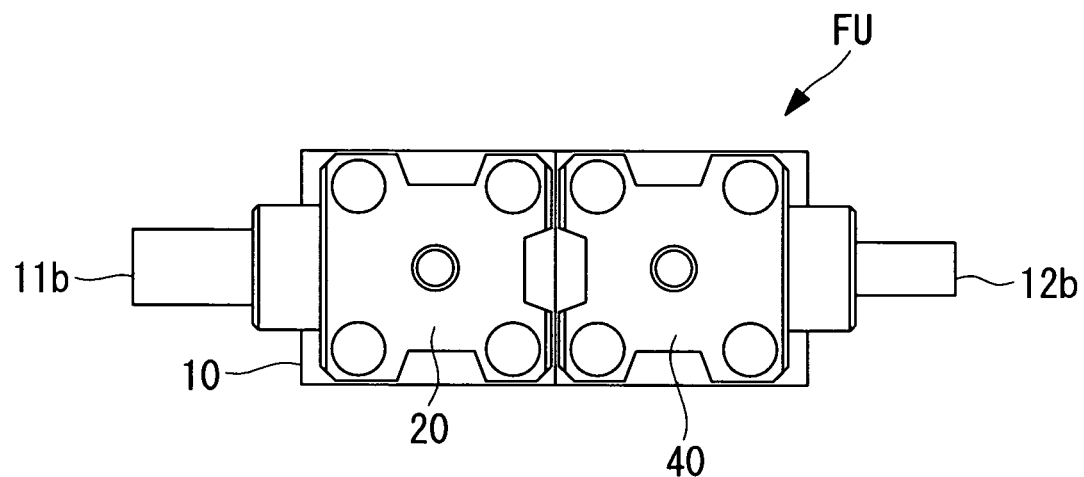
FIG. 2 is a plan view showing the external appearance, as an embodiment of a fluid device unit structure according to the present invention.
Figure 3:
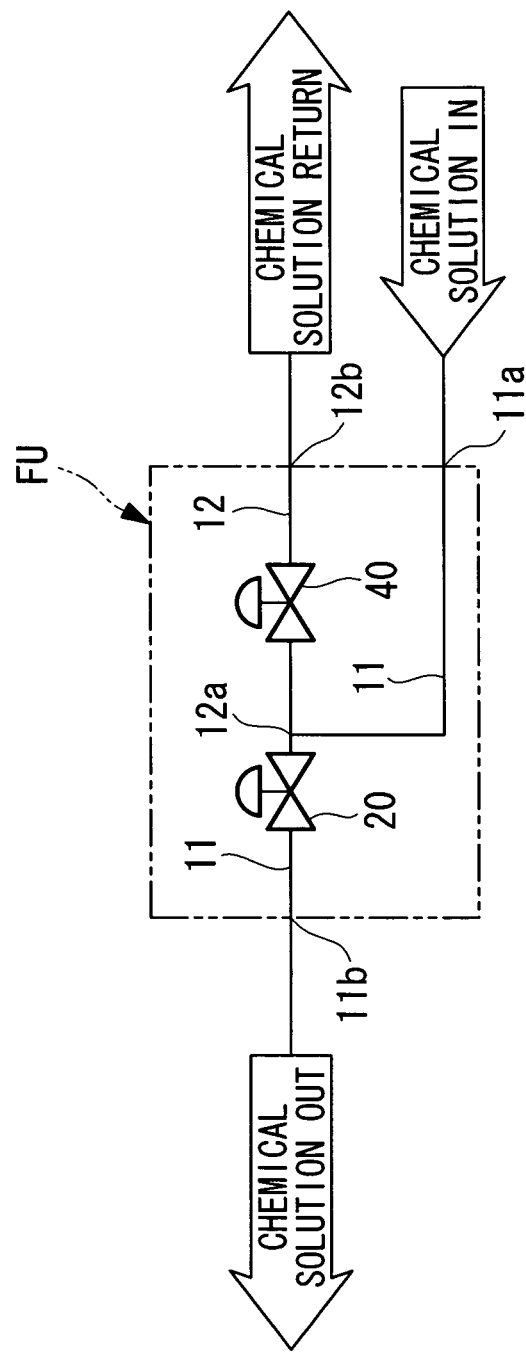
FIG. 3 is a system diagram showing an example of the flow path configuration formed in the fluid device unit of FIG. 1.

The fluid device unit structure shown in FIGS. 1 to 3 is one in which a plurality of fluid devices connected via flow paths are integrated on a base member 10 to form a single unit. In the configuration example shown in the drawings, since a chemical solution is made to flow as the fluid, a main portion (for example, a liquid contacting portion) of the fluid device unit FU is made of a chemical-resistant fluororesin. Furthermore, the fluid device unit FU employs two pneumatic valves 20 and 40 as the fluid devices, and these fluid devices are integrated on the base member 10 to form a single unit.

In the following description, the pneumatic valve of a main fluid flow path 11 formed in the base member 10 is referred to as a first valve 20, and, similarly, the pneumatic valve of a return flow path 12 formed in the base member 10 is referred to as a second valve 40. However, the first valve 20 and the second valve 40 are not limited to pneumatic valves. The reference number 13 in the drawing indicates a base fixing plate.

FIG. 3 shows a flow path (circuit) configuration example of the fluid device unit FU. In this flow path configuration example, the main fluid flow path 11 is formed from an inlet connection port 11a that is connected to a chemical solution supply source to an outlet connection port 11b that is connected to a chemical solution supply destination, and the first valve 20, of the normally closed type, is disposed at an intermediate point in the main fluid flow path 11.

The return flow path 12 is provided by branching from the main fluid flow path 11 at an intermediate point in the main fluid flow path 11 and serves as a flow path for letting the chemical solution return to outside the fluid device unit FU (for example, to the chemical solution supply source). The return flow path 12 is branched from the main fluid flow path 11 at a branching inlet 12a and reaches a return outlet connection port 12b, and the second valve 40, of the normally open type, is provided at an intermediate point thereof.

In the flow path configuration of the above-mentioned fluid device unit FU, in the state where the first valve 20 is opened and the second valve 40 is closed, the chemical solution introduced to the inlet connection port 11a from the chemical solution supply source flows out to the chemical solution supply destination from the outlet connection port 11b through the main fluid flow path 11. During this process, since the second valve 40 of the return flow path 12 is closed, all of the chemical solution flows to the chemical solution supply destination, without flowing out from the return outlet connection port 12b side. Hereinafter, the flow path formed by selecting such an open-and-closed state of the valves is referred to as a "chemical solution supply mode".

On the other hand, in the state where the second valve 40 is opened and the first valve 20 is closed, the chemical solution introduced to the inlet connection port 11a from the chemical solution supply source passes through the main fluid flow path 11 and then flows into the return flow path 12 at the upstream side of the first valve 20 and is thereby returned to the chemical solution supply source from the return outlet connection port 12b. During this process, since the first valve 20 of the main fluid flow path 11 is closed, all the chemical solution flows to the chemical solution supply source, without flowing out from the outlet connection port 11b side. Hereinafter, the flow path formed by selecting such an open-and-closed state of the valves is referred to as a "chemical solution return mode".

The above-described main fluid flow path 11 and the return flow path 12 are provided so as to pass through the base member 10, for example, as shown in FIG. 1.

In the main fluid flow path 11, a horizontal flow path section 11c laterally extends from the inlet connection port 11a provided on the side surface of the base member 10, and a vertical flow path section 11d further extends vertically upward from the end of the horizontal flow path section 11c. At the upper end of the vertical flow path section 11d, a valve chamber 22 in which the valve element 21 of the first valve 20 is disposed so as to move in the up and down directions for the opening and closing operation is provided. In order to prevent the formation of a liquid pool on the bottom face of the valve chamber 22, the valve chamber 22 has a bowl-like shape in which the lowest portion is the center of the bottom face where the vertical flow path section 11d is opened.

Furthermore, the above-described main fluid flow path 11 communicates with a horizontal flow path section 11f having the outlet connection port 11b via a sloping flow path section 11e provided so as to slope downward from the valve chamber 22. That is, the main fluid flow path 11 is constituted of the horizontal flow path section 11c, the vertical flow path section 11d, the sloping flow path section 11e, and the horizontal flow path section 11f that are continuously provided from the inlet connection port 11a to the outlet connection port 11b, and passes through the valve chamber 22 of the first valve 20 disposed at an intermediate point thereof. In other words, the main fluid flow path 11 is a flow path having the first valve 20 disposed between the vertical flow path section 11d and the sloping flow path section 11e.

The return flow path 12 has a sloping flow path section 12c that communicates with the vertical flow path section 11d constituting the main fluid flow path 11 so as to intersect therewith. The sloping flow path section 12c is a flow path branching upward at an incline from the branching inlet 12a that is opened in the vertical flow path section 11d, and communicates with the valve chamber 42 in which the valve element 41 of the second valve 40 is disposed so as to move in the up and down directions for the opening and closing operation. In addition, a vertical flow path section 12d vertically extends downward from the center of the bottom face of the valve chamber 42 and further extends in the horizontal direction from the lower end thereof to communicate with a horizontal flow path section 12e having the return outlet connection port 12b. That is, the return flow path 12 is constituted of the sloping flow path section 12c, the vertical flow path section 12d, and the horizontal flow path section 12e that are continuously disposed from the branching inlet 12a to the return outlet connection port 12b, and passes through the valve chamber 42 of the second valve 40 disposed at an intermediate point thereof. In other words, the return flow path 12 is a flow path having the second valve 40 provided between the sloping flow path section 12c and the vertical flow path section 12d.

In the fluid device unit FU in which the first valve 20 and the second valve 40 are thus integrated on the base member 10 to form a single unit by being connected via the main fluid flow path 11 and the return flow path 12 and being disposed in the main fluid flow path 11 and the return flow path 12 for selectively switching the flow path, the position at which the return flow path 12 is branched from the main fluid flow path 11 is the branching inlet 12a that is close to the upstream side of the first valve 20. By disposing the branching inlet 12a at a position that is as near as possible to the valve chamber 22 of the first valve 20, the length of the vertical flow path section 11d between the branching inlet 12a and the valve chamber 22 is minimized when the state of the open/close valves and flow path of the chemical solution return mode is selected. That is, the length of the vertical flow path section 11d, which is formed between the branching inlet 12a of the return flow path 12 and the first valve 20 and becomes the volume in which a chemical solution remains (chemical solution stagnation portion), can be minimized by locating the position at which the return flow path 12 branches from the main fluid flow path 11 close to the upstream side of the first valve 20.

The above-described chemical solution stagnation portion is formed in the chemical solution return mode and is a portion where hardly any flow occurs, being a concave portion away from the main flow of the chemical solution when the flow path of the chemical solution, which is introduced from the chemical solution supply source into the main fluid flow path 11 via the inlet connection port 11a, is changed to the return flow path 12 at the branching inlet 12a that is opened at an intermediate point in the vertical flow path section 11d. However, since the length of the vertical flow path section 11d between the branching inlet 12a and the valve chamber 22 is minimized for minimizing the volume of the chemical solution stagnation portion, the amount of remaining chemical solution in the chemical solution return mode is also minimized. Consequently, the chemical solution is easily influenced by the main flow and hardly solidifies in the chemical solution stagnation portion. Therefore, when the chemical solution supply mode is selected and the mode is switched thereto, prevention of the supply of chemical solution due to clogging of the main fluid flow path 11 caused by the chemical solution solidified in the chemical solution stagnation portion does not occur, or a decrease in the supply amount of chemical solution to a certain value due to a reduction in the cross-sectional flow path area of the main fluid flow path 11 does not occur.

The position of the branching inlet 12a at which the return flow path 12 branches from the main fluid flow path 11 is preferably close to the upstream side of the first valve 20 for the following reasons: Ideally, the branching inlet 12a is positioned such that no vertical flow path section 11d is formed between the branching inlet 12a and the valve chamber 22, but, actually, the base member 10 forming the flow path must have a sufficient thickness for providing the valve seat 23 of the first valve 20, and the rigidity of the valve seat 23 is important for obtaining a sufficient sealing performance in the valve element 21 of the first valve 20.

Here, the configuration of the first valve 20 will be described. The first valve 20 is a normally closed type in which the valve is closed by receiving a downward pressing force of a biasing means (such as a coil spring, not shown in the drawing). The first valve 20 opens or closes the vertical flow path section 11d by moving the plug-type valve element 21 up and down in the valve chamber 22 by switching the air pressure being supplied to an air pressure control portion 26 on or off. In the plug-type valve element 21, since the main fluid flow path 11 is closed by blocking the opening at the upper end of the vertical flow path section 11d, a valve seat 23 for pressing and sealing the valve element 21 must be provided in the periphery of the opening at the upper end of the main fluid flow path 11d.

Furthermore, inside the above-described valve chamber 22, a flow path portion in which the chemical solution flows is separated by the diaphragm 24. In addition, since the bottom face of the valve chamber 22 has a bowl-like shape, no liquid pool occurs in the valve chamber 22. Therefore, the replaceability of the chemical solution is satisfactory. Note that the reference number 25 in the drawing denotes a shaft integrated with the valve element 21, which moves the valve element 21 up and down by a pressing force of the air pressure control portion 26 or a biasing means.

Thus, since the first valve 20 is of a type in which the upward-facing opening of the vertical flow path section 11d is opened or closed by the up-and-down movement of the plug-type valve element 21, the base member 10 serving as the valve seat 23 of the first valve 20 is required to have a sufficient thickness for imparting sufficient rigidity to the valve seat 23. Therefore, in order to secure a thickness necessary for ensuring the rigidity of the valve seat 23, the branching inlet 12a is formed at a position providing a minimal length path between the branching inlet 12a of the vertical flow path section 11d and the valve chamber 22. That is, the branching inlet 12a is located at the position for minimizing the chemical solution stagnation portion while ensuring sufficient sealing performance of the first valve 20 in the state where the valve element 21 is pressed against the valve seat 23 to completely close the valve.

On the other hand, the second valve 40 of the fluid device unit FU is a normally open type pneumatic valve and has substantially the same configuration as that of the first valve 20 except that the pressing force of the air pressure control portion 46 or a biasing means acts in the direction opposite to that in the first valve 20. Note that the reference number 43 in the drawing is a valve seat, 44 is a diaphragm, and 45 is a shaft.

In the above-described second valve 40, the tip-side of the valve element 42 has an approximately columnar shape whose diameter is constant until reaching the shaft 45, and, in the chemical solution supply mode in which the second valve 40 is closed, an upward pressure of the chemical solution flowing in the main fluid flow path 11 acts on the diaphragm 44 in the direction to open the valve, via the sloping flow path section 12c of the return flow path 12. Such a pressure of the chemical solution (liquid) is called a back pressure and is increased with an increase in the area of the diaphragm 44. Therefore, in order to avoid the valve element 42 being opened by the back pressure, it is necessary to increase also the air pressure of the air pressure control portion 46 for keeping the valve element 42 in a closed state.

Figure 4:
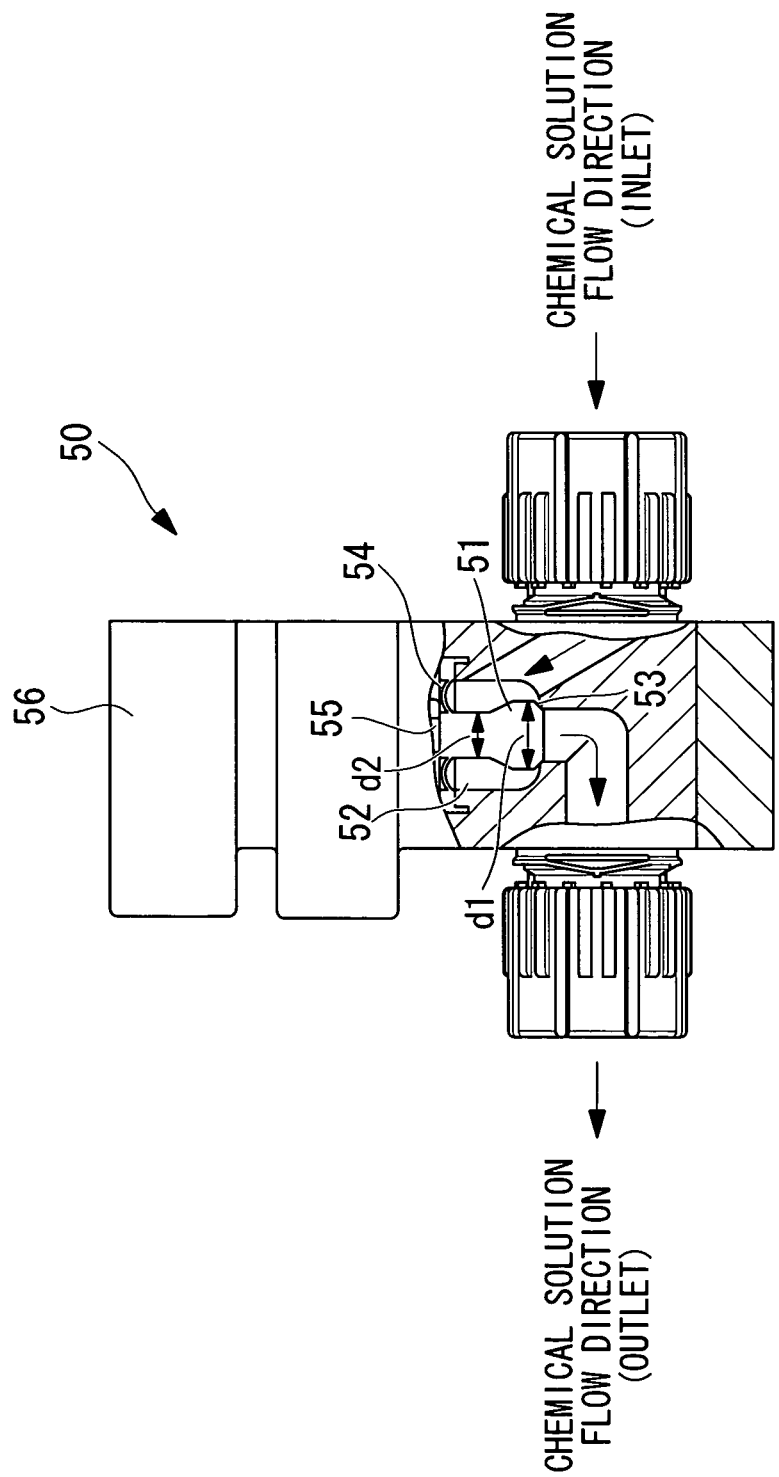
FIG. 4 is a sectional view of a relevant portion showing an example of the valve element shape of a second valve.

As in the above-described second valve 40, in a high back-pressure responsive valve in which the air pressure for the opening and closing operation is increased in accordance with a large back pressure, for example, as in the pneumatic valve 50 shown in FIG. 4, the valve element 51 is preferably set to have a base-side diameter d2 smaller than a tip-side diameter d1 (d1>d2). Note that the reference number 52 in the drawing is a valve chamber, 53 is a valve seat, 54 is a diaphragm, 55 is a shaft, and 56 is an air pressure control portion, and the direction of chemical solution flow is indicated by the arrows.

In such a pneumatic valve 50, the diaphragm 54 can be reduced in size corresponding to the reduction in the base-side diameter d2 of the valve element 51. Therefore, the pressure-receiving area of the diaphragm 54 can be reduced to provide a high back-pressure responsive valve in which the air pressure of the air pressure control portion 56 can be reduced.

Thus, by employing a high back-pressure responsive pneumatic valve 50 as the second valve 40, that is, by reducing the diameter of the diaphragm 54 in addition to the base-side diameter d2 of the valve element 51, the pressure (back pressure) of the liquid acting in the (upward) direction to open the valve element 51 when it is completely closed is reduced, which enables a reduction in the pressing force in the direction for closing the valve element 51 by the air pressure control portion 54. Therefore, in the pneumatic valve 50, the pressure resistance of the air pressure control portion 56 can be reduced, which is advantageous for a reduction in size or a reduction in cost. In addition, the employment of such a high back-pressure responsive pneumatic valve 50 for the second valve 40 can contribute to reductions in size and cost of the above-mentioned fluid device unit FU.

Furthermore, if the external dimensions of the pneumatic valve 50 are made to be substantially the same, the thickness at the casing portion can be increased corresponding to the reduction in the diameter of the diaphragm 54. Therefore, the working pressure (pressure resistance of the valve) can also be increased while maintaining the valve seat port diameter (inlet diameter of the vertical flow path section 12d), which affects the flow rate characteristics.

Note that, in the description above, a normally open type high-pressure responsive valve in which the valve element 51 is closed by the air pressure control portion 56 has been described, but the structure for changing the diameter of the valve element 51 can be applied to a valve employing an open-and-close operation mechanism, such as an electromagnet, instead of the air pressure control portion 56.

As described above, in the fluid device unit FU of the present invention, the chemical solution stagnation portion that is formed between the first valve 20 of the main fluid flow path 11 and the branching inlet (branching point) 12a of the return flow path 12 is minimized, and thereby solidification of a chemical solution hardly occurs. Therefore, even if the liquid to be handled easily solidifies, such as a slurry-like chemical solution, prevention of the supply of chemical solution due to clogging of the main fluid flow path 11 does not occur, or a decrease in the supply amount of chemical solution due to a reduction in cross-sectional area of the flow path does not occur. Therefore, the application of the fluid device unit FU to a semiconductor manufacturing process can significantly enhance the reliability of the devices.

In the above-described embodiment, the fluid device unit FU has a configuration in which two pneumatic valves 20 and 40 are disposed on a base member 10, but the fluid device unit FU of the present invention is not limited thereto. For example, the fluid device unit FU may include other fluid devices, such as a flow rate controlling valve or a pressure sensor, to be integrated on the upstream or downstream sides of the pneumatic valves 20 and 40. Furthermore, the pneumatic valves 20 and 40 disposed in the main fluid flow path 11 and the return flow path 12 may be changed to, for example, electromagnetic valves and are not limited to those described in the embodiment; suitable modifications that do not depart from the gist of the present invention are allowed.

The invention claimed is:

1. A fluid device unit structure comprising:
a plurality of fluid devices including first and second valves;
a base member defining flow paths including a main fluid flow path and a return flow path that are respectively provided to interconnect the valves,
wherein a position at which the return flow path branches from the main fluid flow path is close to an input of the first valve and extends to an input of the second valve,
wherein the base member is monolithic and the position minimizes a stagnant flow area adjacent the input of the first valve when the first valve is closed,
wherein the main fluid flow path includes:
a horizontal flow path section that laterally extends from an inlet connection port provided on a side surface of the base member, and
a vertical flow path section that extends vertically upward from the horizontal flow path section,
wherein the return flow path has a sloping flow path section that communicates with the vertical flow path section so as to intersect therewith,
wherein the sloping flow path section is a flow path branching upward at an incline from a branching inlet that is opened in the vertical flow path section, and the sloping flow path section communicates with a valve chamber of the second view.

2. The fluid device unit structure according to claim 1, wherein the first valve moves a plug-type valve element up and down to open or close an upward-facing opening of the main fluid flow path and the base member defines a valve seat of the first valve and has a sufficient thickness ensuring adequate stiffness of the valve seat.

3. The fluid device unit structure according to claim 1, wherein the second valve receives a liquid pressure with a diaphragm, opens and closes the return flow path by moving a plug-type valve element up and down by an open-and-close operation mechanism, and has a valve element having a base-side diameter smaller than a tip-side diameter.

* * * * *